United States Patent [19]
Remericq

[11] Patent Number: 6,021,886
[45] Date of Patent: Feb. 8, 2000

[54] INSTALLATION FOR THE TEMPORARY STORAGE OF ARTICLES

[75] Inventor: Maurice Remericq, Bousbecque, France

[73] Assignee: Sierem, S.A., Comines, France

[21] Appl. No.: 08/934,814

[22] Filed: Sep. 22, 1997

[30] Foreign Application Priority Data

Feb. 24, 1996 [FR] France .................................. 96 11829

[51] Int. Cl.[7] .................................................. B65G 25/00
[52] U.S. Cl. ........................ 198/429; 198/418.4; 414/72
[58] Field of Search .................... 198/418.4, 429; 414/72, 54

[56] References Cited

U.S. PATENT DOCUMENTS

| | | | |
|---|---|---|---|
| 3,954,165 | 5/1976 | Snyder | 198/418.4 |
| 4,325,475 | 4/1982 | Spalding | 198/429 |
| 4,523,671 | 6/1985 | Campbell | 198/429 |
| 5,897,292 | 4/1999 | Gerwe et al. | 198/418.4 X |

FOREIGN PATENT DOCUMENTS 296 00 932   3/1996   Germany .

*Primary Examiner*—William E. Terrell
*Assistant Examiner*—Gene O. Crawford
*Attorney, Agent, or Firm*—Kerkam, Stowell, Kondracki & Clarke, P.C.; Dennis P. Clarke

[57] ABSTRACT

An installation (1) for storing articles (2) and unloading them in batches (3), comprising a flexible element (5) constituting a conveyor loop which cooperates with rotating mechanisms (6–10) for guiding and driving its movement in a direction (C1, C2) along a polygonal path and carries means (5A) for receiving articles. A point (P1) is provided for loading articles (2) onto the conveyor element (5) and a point (P2, P3) is provided for unloading batches placed on the conveyor element on a straight section (5B, 5C) of the flexible element (5). Also included is a means (15A, 15B) for controlling the advance of the conveyor element to the various points (P1, P2, P3) and a device (16) for controlling the operation of the installation.

5 Claims, 2 Drawing Sheets

INSTALLATION FOR THE TEMPORARY STORAGE OF ARTICLES

BACKGROUND OF THE INVENTION

Field of the Invention

The invention relates to an installation for the temporary storage of articles, particularly flat articles delivered to a loading point, and the subsequent unloading of these articles, particularly in batches.

The invention also relates to a process for controlling the operation of this installation.

SUMMARY OF THE INVENTION

The invention relates more particularly, though not exclusively, to an installation for the temporary storage of flat articles such as health care products, in order to form batches for packaging.

One object of the invention is to obtain an installation that makes it possible to unload, that is, to produce batches of articles at at least two separate points, while it continues to accept the storage of other articles at the loading point, that is, without adversely affecting the production rate of a machine for producing articles (not represented) disposed upstream from the loading point.

For example, batches intended to be handled automatically by a packaging machine can be picked up at one of the unloading points, while at least one other batch can be picked up at another unloading point, particularly in order to be handled manually.

Another object of the invention is to obtain an installation which makes it possible, when necessary, to produce only one batch of articles, that is, for example, in case of a stoppage of a device for packaging batches of articles delivered by a production station.

To this end, the subject of the invention is an installation of the type mentioned above, particularly characterized in that:

the rotating mechanisms disposed at the level of the remote ends of at least two of the adjacent sides of the conveyor element, that is, of two sides disposed on either side of the same rotating mechanism which extend in secant directions, are each:

borne by a means for translational guidance in a direction substantially parallel to the direction of the side with whose end they cooperate, at least elastically stressed in a direction of travel which induces the tension of the side in question, the rotating mechanism on either side of which the two above-mentioned sides extend, and at least one other rotating mechanism of the installation are each associated with a means for selectively driving and braking their rotation so as to constitute the means for controlling the advance of the conveyor element to the various loading and unloading points, and at least two separate means for unloading batches of articles are each disposed so as to extract batches of articles located on one of the above-mentioned sides.

Another subject of the invention is a process for controlling the operation of the above-mentioned installation.

BRIEF DESCRIPTION OF THE DRAWINGS

The invention will be more clearly understood with the aid of the following description given as a non-limiting example in reference to the appended drawing which schematically represents, in FIGS. 1 and 2, a top view of an installation according to the invention, in two embodiments.

DETAILED DESCRIPTION OF THE INVENTION

Figure 1:
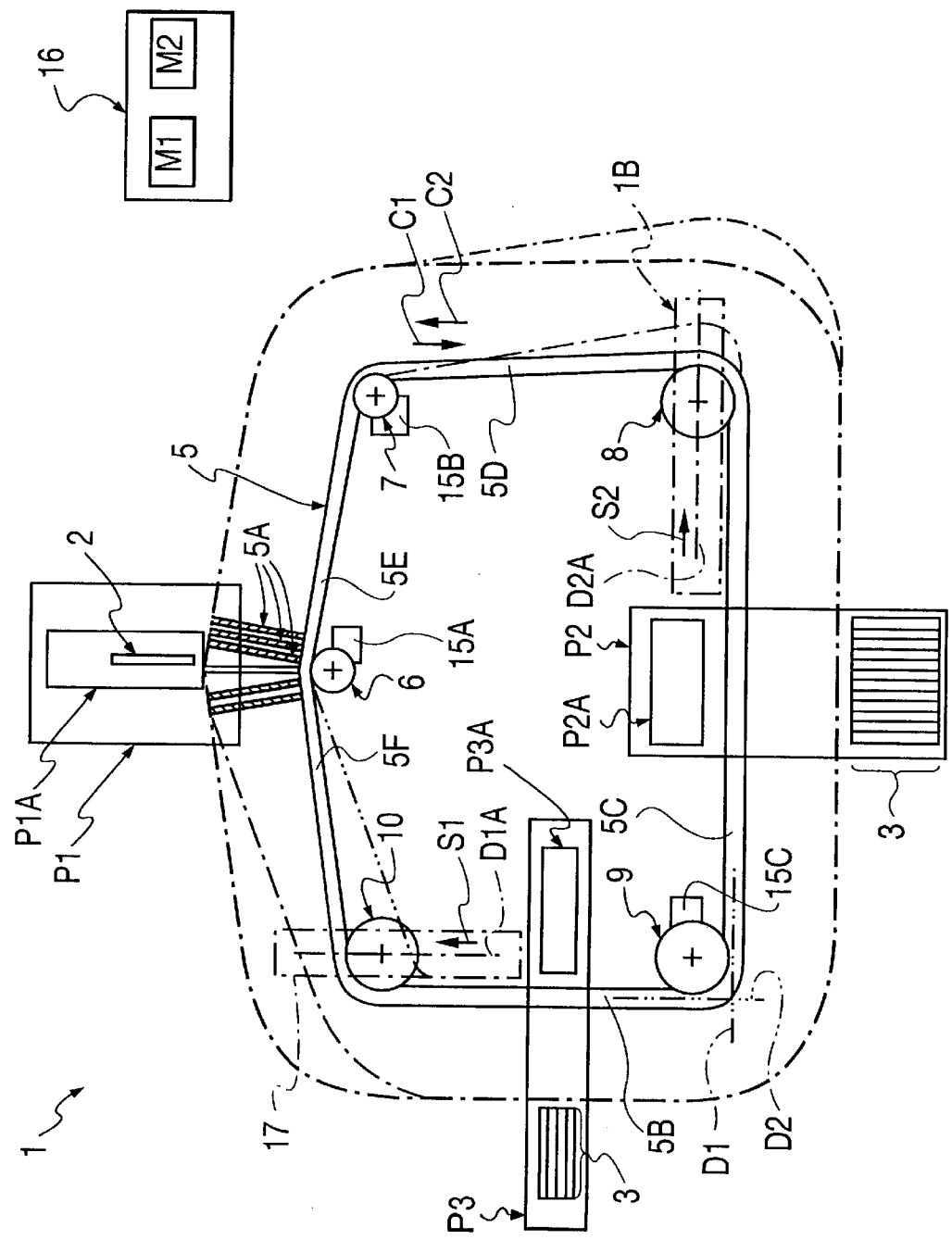

Please refer to the drawing, which shows an installation 1 for the temporary storage of articles 2, particularly flat articles, and the unloading of these articles, particularly in batches 3.

In addition to a frame (not shown), the installation 1 comprises at least:

a flexible element 5 constituting a closed conveyor loop in an approximately horizontal plane which cooperates with rotating mechanisms 6 through 10 for guiding and driving its movement in a direction C1, C2 along a predetermined polygonal path, and which carries means 5A for receiving articles, a point P1 for loading articles 2 onto the conveyor element 5, which point comprises at least one loading means P1A, a point P2, P3, P4 for unloading batches of articles 2 placed on the conveyor element, on a straight section 5B, 5C of this element 5, which point P2, P3, P4 comprises at least one means P2A, P3A, P4A for unloading batches of articles 2, a means 15A, 15B, 15C for controlling the advance of the conveyor element to the various points P1, P2, P3, P4, and a device 16 for controlling the operation of the installation, that is, as many means 15A, 15B, 15C for controlling the advance of the conveyor element as there are loading and unloading points P1, P2, P3, P4.

The rotating mechanisms 6 through 10 are disposed in such a way that the flexible element S comprises distinct, substantially straight sides 5B, 5C, 5D, 5E, 5F disposed along the sides of a polygon.

Remarkably:

the rotating mechanisms 8, 10 disposed at the level of remote ends of sides of at least one group of two adjacent sides 5B, 5C of the conveyor element 5, that is, of two sides 5B, 5C disposed on either side of the same rotating mechanism 6, 9, which extend in secant directions D1, D2, are each:

borne by a means 17, 18 for translational guidance in a direction D1A, D2A substantially parallel to the direction D1, D2 of the side 5B, 5C, with whose end they cooperate, at least elastically stressed in a direction of travel S1, S2 which induces the tension of the side 5B, 5C in question, the rotating mechanism 6, 9 on either side of which the two above-mentioned sides 5B, 5C extend, and at least one other rotating mechanism 7 of the installation are each associated with at least one driven element 15A, 15S, 15C which acts at least indirectly on its rotation so as to constitute the means 15A, 15B, 15C for controlling the advance of the conveyor element 5 to the various loading and unloading points P1, P2, P3, P4, and at least two separate means P2A, P3A, P4A for unloading batches of articles, each disposed so as to extract batches of articles located on one of the above-mentioned sides 5B, 5C.

These technical features make it possible to achieve the stated object of the invention, that is, to obtain an installation which makes it possible to unload, that is, to produce batches 3 of articles at at least two separate points P2, P3, P4, while it continues to accept the storage of other articles at the point for this purpose, without adversely affecting the production rate of a machine for producing articles (not represented) disposed upstream from the loading point.

Figure 2:
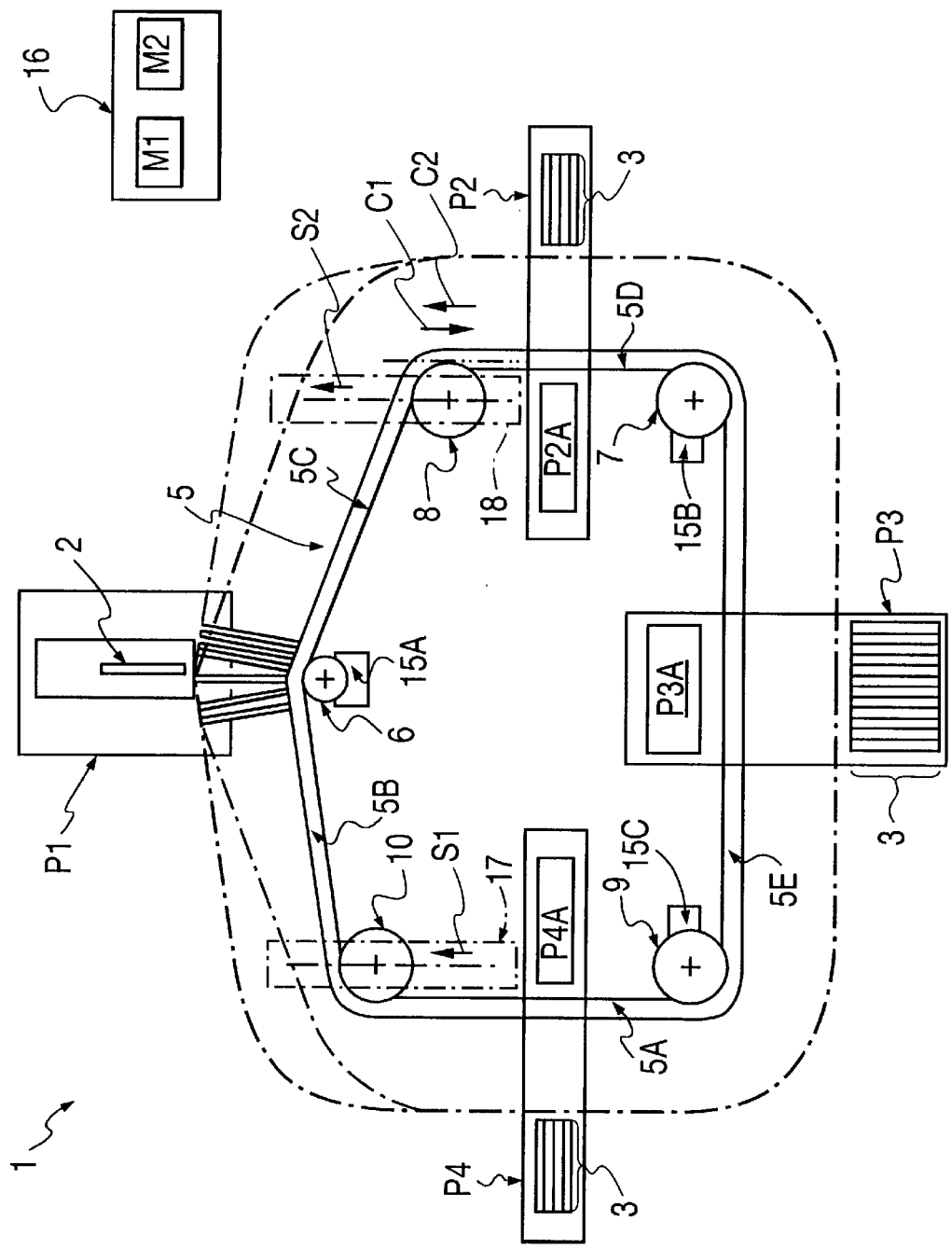

For example, batches 3 intended to be handled automatically by a packaging machine (not represented) can be picked up at any one P2 (FIG. 1) or P3 (FIG. 2) of the unloading points P2, P3, P4, while another batch 3 can be picked up at another unloading point P3 (FIG. 1), P2, P4 (FIG. 2), particularly in order to be handled manually.

Remarkably, at least some of the driven elements 15A, 15B, 15C which act at least indirectly on the rotation of rotating mechanisms 6, 7, 9 cooperating with the conveyor element, are the type with two directions of rotation.

Equally remarkably, at least some of the driven elements 15A, 15B, 15C which act at least indirectly on the rotation of rotating mechanisms 6, 7, 9 cooperating with the conveyor element, comprise an element which can selectively carry out at least one of the operations comprising the driving and the stopping of the rotation of each rotating mechanism 6, 7, 9 provided.

This makes it possible, in particular, for the conveyor element 5 to move in two opposite directions.

The construction of an installation 1 consistent with these characteristics makes it possible to obtain the results stated above.

The invention also relates to a process for controlling the operation of the installation.

This process is noteworthy in that in order to allow the unloading of batches 3, each having a predetermined number of articles, at at least two successive unloading points P2, P3, P4 of the installation, that is, at points that are successive in a predetermined direction of travel of the conveyor element 5:

at the level of the loading point P1, the conveyor element 5 is advanced and a number of articles at least equal to the total number of articles comprising the batches 3 of the successive points are placed onto this element, and during the advance of the conveyor element 5 to each point P2, P3, P4 for unloading a batch 3 of a predetermined number of articles, at least substantially before the unloading of the batch at the level of this point, a number of articles at least equal to the total number of articles intended to constitute the batches of the unloading points which come after the point in question in the direction of travel of the conveyor element is allowed to pass by.

For example, in order to load a predetermined number of articles onto the conveyor element 5, at the level of the loading point P1, at least one of the rotating mechanisms 6, 7, 9 is driven in rotation and all the other rotating mechanisms are released, at least until the loading of the predetermined number of articles onto the conveyor element is complete.

In order to extract another predetermined number of articles at a predetermined unloading point P2, P3, P4 by advancing the conveyor element at least up to the predetermined unloading point:

the predetermined number of articles is conveyed to this unloading point P2, P3, P4, and the conveyor element is stopped, by stopping the rotation of at least one of the rotating mechanisms 6, 7, 9 between which the side of the conveyor element from which the articles must be unloaded is held taut, during the stoppage of the conveyor element at the unloading point P2, P3, P4, the articles are extracted, and if necessary, articles continue to be loaded at the loading point P1.

When the loading point P1 continues to operate during the unloading of batches of articles, this causes the translational displacement of at least one of the rotating mechanisms 8, 10 which are borne by a means 17, 18 translational guidance in a direction D1A, D2A substantially parallel to the direction D1, D2 of the side 5B, 5C of the conveyor element 5 with whose end they cooperate.

One skilled in the art would be able to determine the course of the translational guidance that must be provided so that the advance of the element to the loading point P1 can be ensured throughout the unloading of a batch of articles.

Remarkably, when a batch 3 of articles 2 has been unloaded and at least one of the rotating mechanisms 8, 10 guided in translation has undergone a translational displacement from a first position to a second position, in order to allow this displaced rotating mechanism 8, 10 to return to its first position under the influence of an elastic return means, while monitoring the position of each translated mechanism 8, 10, the rotation speed of the rotating mechanisms 6, 7, 9 placed under the influence of the driven elements 15A, 15B, 15C, which act at least indirectly on their rotation, is selectively adjusted so that the return to the first position occurs gradually.

The process for controlling the operation of the installation, that is, as many means 15A, 15B, 15C for controlling the advance of the conveyor element as there are loading and unloading points, is implemented in the device 1A for controlling the installation 1.

Advantageously, the device 16 for controlling the operation of the installation comprises:

at least one first means M1 for controlling the loading point P1 and means 15A, 15B, 15C for controlling the advance of the conveyor element 5 so as to allow the placement onto the conveyor element 5 of a number of articles at least equal to the total number of articles which must comprise the batches of the successive unloading points, and at least one second means M2 for controlling the unloading points and means 15A, 15B, 15C for controlling the advance of the conveyor element 5 so as to allow, during the advance of the conveyor element 5 to each point P2, P3, P4 for unloading a batch 3 of a predetermined number of articles, at least substantially before the unloading of the batch at the level of this point, the passage of a number of articles at least equal to the total number of articles intended to constitute the batches of the unloading points which come after the point in question in the direction of the advance C1, C2 of the conveyor element.

I claim:

1. An installation (1) for the temporary storage of flat articles (2) and the subsequent unloading of said articles (2) in batches (3) of a predetermined number of articles, which installation (1) comprises at least:

a flexible element (5) constituting a closed conveyor loop in a substantially horizontal plane; rotating mechanisms in cooperation with said flexible element (6–10) for guiding and driving its movement in a direction (C1, C2) along a predetermined polygonal path, and a carrying means (5A) for receiving articles;

a point (P1) for loading articles (2) onto the conveyor element (5), which point comprises at least one loading means (P1A);

a point (P2, P3, P4) for unloading batches of articles (2) placed on the conveyor element, on a straight section (5B, 5C) of said element (5), which point (P2, P3, P4) comprises at least one means (P2A, P3A, P4A) for unloading batches of articles (2);

a means (15A, 15B, 15C) for controlling the advance of the conveyor element to the various points (P1, P2, P3, P4);

a device (16) for controlling the operation of the installation comprising as many means (15A, 15B, 15C) for controlling the advance of the conveyor element as there are loading or unloading points (P1, P2, P3, P4), the rotating mechanisms (6–10) in this installation being disposed so that the flexible element (5) comprises distinct, substantially straight sides (5B, 5C, 5D, 5E, 5F) disposed on the sides of a polygon, which installation is characterized in that:

the rotating mechanisms (8, 10) disposed at the level of remote ends of sides of at least one group of two adjacent sides (5B, 5C) of the conveyor element (5) disposed on either side of the same rotating mechanism (6, 9), which extend in secant directions (D1, D2), are each:

borne by a means (17, 18) for translational guidance, in a direction (D1A, D2A) substantially parallel to the direction (D1, D2) of the side (5B, 5C) with whose end they cooperate;

at least elastically stressed in a direction of travel (S1, S2) which induces the tension of said side (5B, 5C);

the rotating mechanism (6, 9) on either side of which said sides (5B, 5C) extend, and at least one other rotating mechanism (7) of the installation are each associated with at least one driven element (15A, 15B, 15C) which acts at least indirectly on its rotation so as to constitute the means for controlling the advance of the conveyor element (5) to the various loading and unloading points (P1, P2, P3, P4); and at least two separate means (P2A, P3A, P4A) for unloading batches of articles, each disposed so as to extract batches of articles located on one of said sides (5B, 5C).

2. The installation according to claim 1 characterized in that at least some of the driven elements (15A, 15B, 15C) which act at least indirectly on the rotation of rotating mechanisms (6, 7, 9) cooperating with the conveyor element have two directions of rotation.

3. The installation according to claim 1 or 2 characterized in that at least some of the driven elements (15A, 15B, 15C) which act at least indirectly on the rotation of rotating mechanisms (6, 7, 9) cooperating with the conveyor element comprise an element which can selectively carry out at least one of the operations comprising the driving and the stopping of the rotation of each rotating mechanism (6, 7, 9).

4. A process for controlling the operation of the installation according to any of claim 1–3 characterized in that, in order to allow the unloading of batches (3), each having a predetermined number of articles, at least two successive unloading points (P2, P3, P4) of the installation in a predetermined direction of travel of the conveyor element (5):

at the level of the loading point (P1), the conveyor element (5) is advanced and a number of articles at least equal to the total number of articles comprising the batches (3) of the successive posts are placed onto this element; and during the advance of the conveyor element (5) to each point (P2, P3, P4) for unloading a batch (3) of a predetermined number of articles, at least substantially before the unloading of the batch at the level of said point, a number of articles at least equal to the total number of articles intended to constitute the batches of the unloading points which come after the point in question in the direction of travel of the conveyor element is allowed to pass by.

5. A process for controlling the operation of the installation according to any of claim 1–3 characterized in that, when a batch (3) of articles (2) has been unloaded and at least one of the rotating mechanisms (8, 10) guided in translation has undergone a translational displacement from a first position to a second position, in order to allow said displaced rotating mechanism (8, 10) to return to its first position under the influence of an elastic return means while monitoring the position of each translated element (8, 10), the rotation speed of the rotating mechanisms (6, 7, 9) placed under the influence of the driven elements (15A, 15B, 15C) which act at least indirectly on their rotation is selectively adjusted so that the return to said first position occurs gradually.

* * * * *